(No Model.) 2 Sheets—Sheet 1.
C. F. SCHAD.
Glass and other Furnaces.
No. 230,577. Patented July 27, 1880.
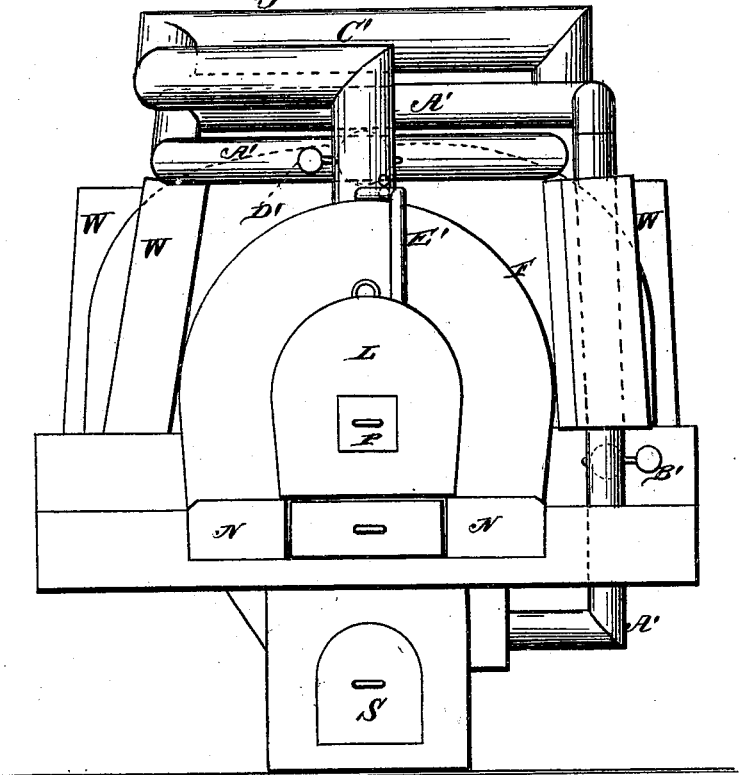
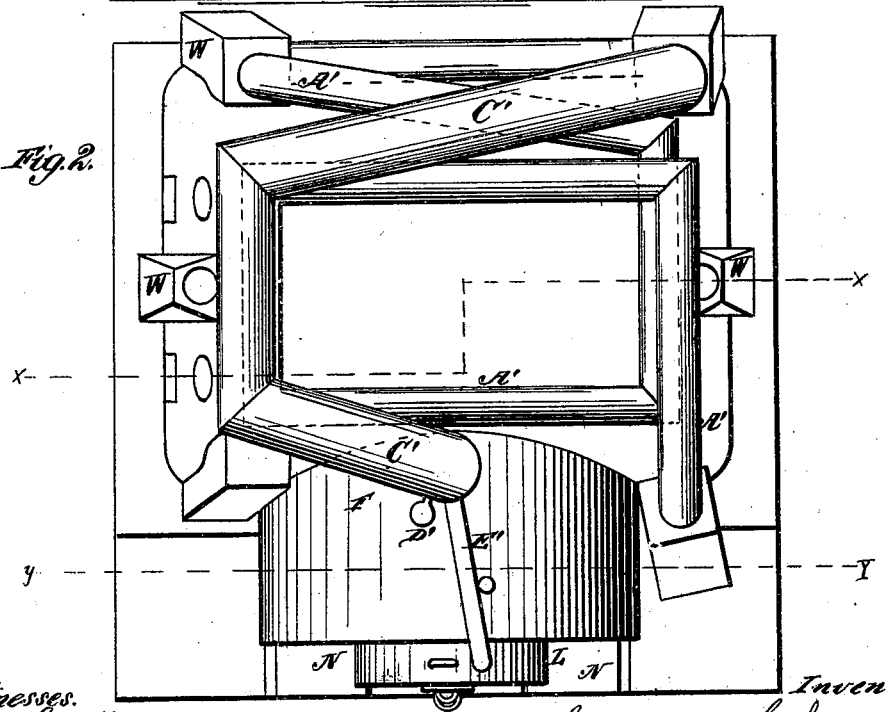
Witnesses.
Robert Everett
James J. Sheehy
Inventor:
Carl F. Schad.
J. Clement Smith.
Attorney.

(No Model.) 2 Sheets—Sheet 2.
C. F. SCHAD.
Glass and other Furnaces.
No. 230,577. Patented July 27, 1880.
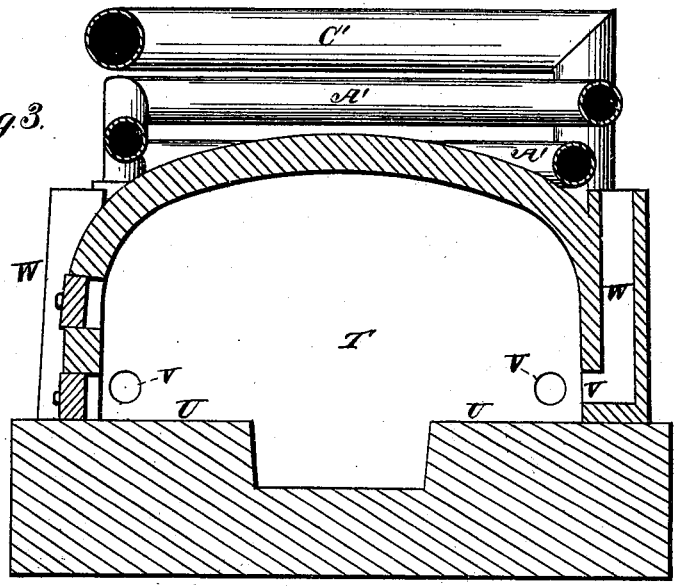
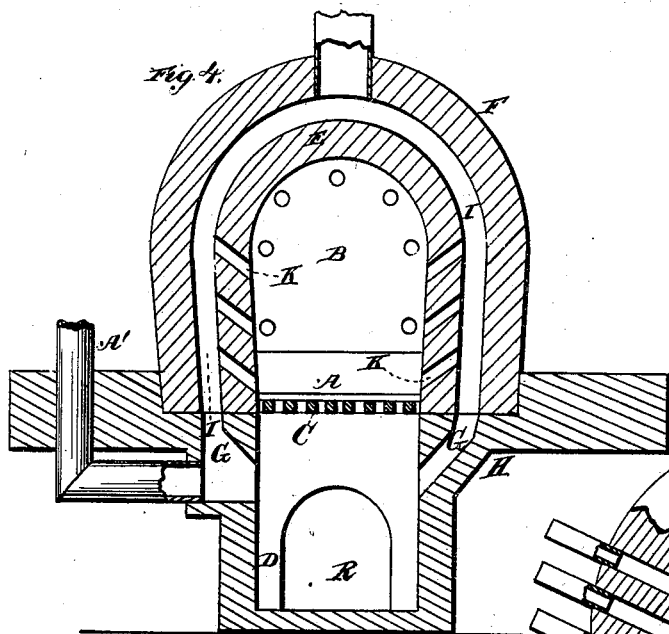
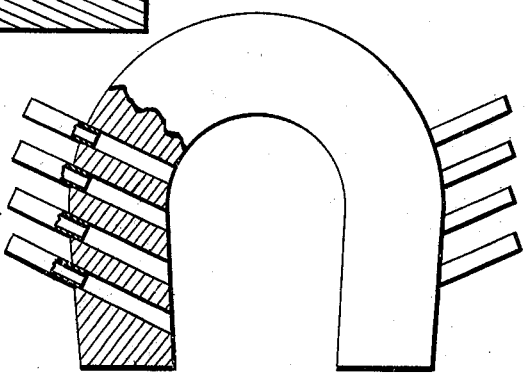
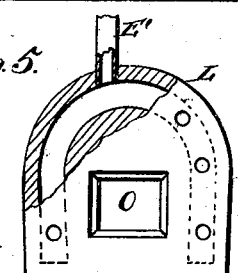
Witnesses.
Robert Everett
James J. Sheehy
Inventor:
Carl F. Schad.
J Clement Smith.
Attorney.

UNITED STATES PATENT OFFICE.

CARL F. SCHAD, OF BELLEFONTE, PENNSYLVANIA.

GLASS AND OTHER FURNACES.

SPECIFICATION forming part of Letters Patent No. 230,577, dated July 27, 1880.

Application filed June 17, 1880. (No model.)

*To all whom it may concern:*

Be it known that I, CARL F. SCHAD, a citizen of the United States, residing at Bellefonte, in the county of Centre and State of Pennsylvania, have invented certain new and useful Improvements in Glass and other Furnaces; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain improvements in glass and other furnaces; and it has for its object to provide for the thorough combustion of the smoke and gaseous matters generated by the burning fuel, whereby a saving of fuel is effected and a better quality of manufactured articles are produced. These objects I attain by the apparatus illustrated in the accompanying drawings, in which—

Figure 1 represents a front elevation of my apparatus. Fig. 2 represents a plan view. Fig. 3 represents a vertical section through the lines *x x* of Fig. 2. Fig. 4 is a section through line *y y* of Fig. 2. Fig. 5 is a detail view in section, and Fig. 6 is a detached view of a modification of the arch of the fire-chamber.

The letter A indicates the furnace proper; B, the combustion-chamber thereof; C, the grate, and D the ash-pit.

The combustion-chamber is composed of an inner arch, E, and an outer arch, F, having an air-space between them, which communicates by means of slots or apertures G in the base or bed plate H of the furnace with air-chambers I at each side of and communicating with the ash-pit. The inner arch, which forms the internal walls of the combustion-chamber of the furnace, is perforated at intervals on each side, as indicated by the letter K, the perforations in the present instance being in the form of slots, which are downwardly-inclined toward the combustion-chamber, although such perforations may be of any other shape, and may be horizontal if found advantageous.

Instead of the double arches, the combustion-chamber may be formed of a single solid arch, as indicated by the modification illustrated in Fig. 6 of the drawings, and a series of tuyeres or pipes leading into the combustion-chamber may be substituted for the apertures or perforations before mentioned.

At the front of the furnace, and immediately in front of the combustion-chamber, is located a removable section, L, which rests upon the bed-plate or base of the furnace, and which can be removed at pleasure, so as to afford an unobstructed passage for the removal of cinders, clinkers, and other accumulations from the grate-bars. At each side of said removable section are located the stationary blocks N. upon which the front section, L, of the combustion-chamber rests. The said section is hollow and provided with openings through its inner wall, by means of which a blast of air may be directed forward into the combustion-chamber.

The letter O indicates an opening in the front section for the fuel, which is closed by a door, P, and R an opening at the front of the ash-pit, for the removal of ashes, which is closed by a door, S.

The letter T indicates the oven of the furnace, located immediately back of the combustion-chamber and communicating therewith. The interior of said oven is provided with beds U at each side, upon which the pots containing the glass or the other articles to be heated may be placed.

The letter V indicates the escape-openings for conveying the products of combustion from the oven, the said openings leading into the flues W at the corners and sides of the oven on the outside.

The letter A' indicates a blast-pipe extending up through the flue W at one corner of the oven and down through the flue diagonally opposite at another corner, the said pipe traversing the top of the oven, as shown, in order to heat the air on its passage. The said pipe connects with one of the chambers communicating with the ash-pit at one end and with a suitable blast-supply at the other, whereby a blast of air may be introduced below the grate and into the space between the arches forming the combustion-chamber. The pipe is provided with a valve or damper, B', by means of which the blast may be regulated or cut off entirely.

The letter C' indicates a similar blast-pipe connected with the blast-supply and extending up through one of the flues W, after which it traverses the top of the oven and connects with the upper part of the space between the arches forming the combustion-chamber. The said pipe is also provided with a damper, D', by which the blast may be regulated or cut off entirely.

The letter E' indicates a pipe leading from the pipe C' into the hollow front section of the furnace for supplying a blast of air to the same.

Although my invention has been described as particularly applicable to glass-furnaces, it is evident that it may be applied with advantage to all classes of furnaces employed for industrial purposes where an intense heat is desired; and hence I do not desire to limit myself to such invention as applied to a glass-furnace simply.

Having thus fully described my invention, what I claim, and desire to secure by Letters Patent, is—

1. The combination, in a furnace, of a combustion-chamber composed of two arches having an intervening space connected with a blast-supply, the inner arch being provided with apertures leading from the space to the combustion-chamber, whereby a blast of air may be supplied to said combustion-chamber, substantially as and for the purposes specified.

2. In combination with the combustion-chamber, the removable section, located in front of the lower part of said combustion-chamber, substantially as and for the purposes specified.

3. In combination with the combustion-chamber, the hollow front section connected with a suitable blast-supply and provided with apertures in its inner wall, whereby a blast of air may be directed forward into the combustion-chamber, substantially as specified.

4. In combination with the ash-pit of the furnace, the blast-pipe leading from a blast-supply up through one of the escape-flues, then traversing the top of the oven, then down through the diagonally-opposite flue and into the ash-pit, the said pipe being provided with a damper or valve, substantially as and for the purposes specified.

5. In combination with the arches forming the combustion-chamber, a blast-pipe leading from a suitable blast-supply up through one of the escape-flues of the furnace, then traversing the top of the oven and connecting with the space between the arches, the said pipe being provided with a valve or damper, substantially as and for the purposes set forth.

In testimony whereof I affix my signature in presence of two witnesses.

CARL FRIEDRICH SCHAD.

Witnesses:
I. G. BACKOFEN,
FREDERICK BECKER.